June 27, 1961  A. J. STEPHENS  2,990,201

WHEEL OIL SEALS

Filed May 9, 1958

INVENTOR.
ALLEN J. STEPHENS
BY
ATTORNEY

2,990,201
WHEEL OIL SEALS
Allen J. Stephens, 1144 Broadway, Denver, Colo.
Filed May 9, 1958, Ser. No. 734,213
3 Claims. (Cl. 286—11)

This invention relates to a sealing device for sealing lubricating oil in the hub of a rotating element, and while more particularly applicable for use on idling vehicle wheels, such as used on trailers and the like, it is not limited to this particular use, but will be found valuable wherever it is desired to seal the hub of a rotating element against leakage of a lubricant.

Idler wheels such as used on trailers and similar vehicles, are usually lubricated with hard oil or axle grease, since it has been found difficult to retain fluid oil in the bearings thereof. The principal object of this invention is to provide a leak proof, long lived, wheel oil seal which will enable fluid oil to be effectively used for wheel lubrication, and to so construct the improved wheel oil seal that it can be quickly and easily installed in present grease type wheel hubs without requiring any changes in the latter, and without the use of special tools.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 1:
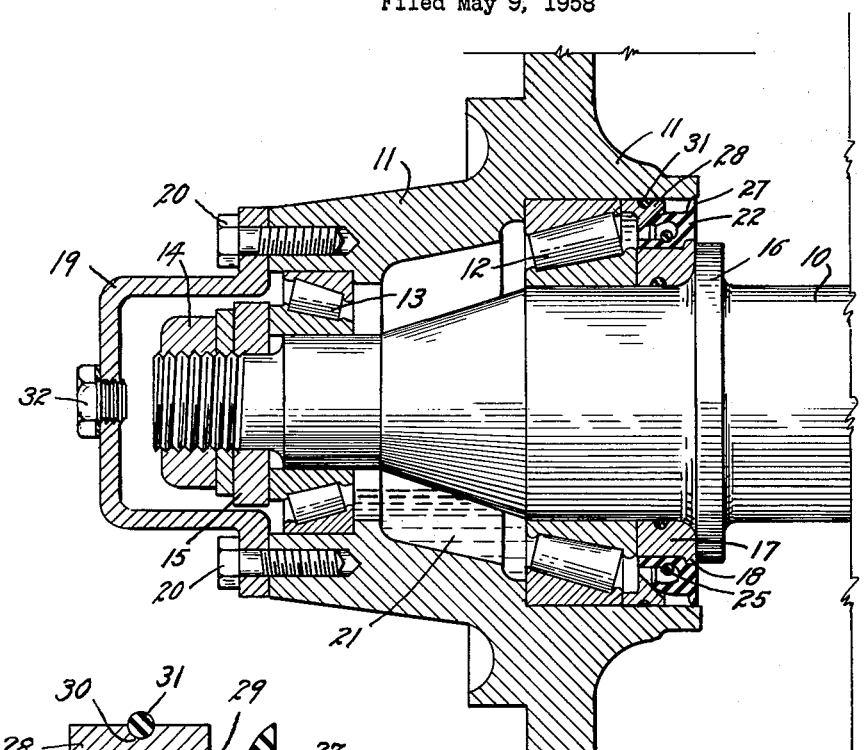
FIG. 1 is a vertical longitudinal section of a conventional trailer wheel hub with the improved wheel oil seal in place therein.

For the purpose of illustrating the working position of the improved wheel oil seal, a conventional trailer axle spindle is illustrated at 10, with an idler wheel hub 11 rotatably mounted thereon by means of an inner bearing 12 and an outer roller bearing 13, the wheel being retained in place against an annular spindle bearing band 16 by means of the usual hub nut 14 and retaining washers 15 as is usual in trailer wheel constructions. For the uses of this invention, the entire hub is sealed about the nut 14 by means of any suitable sealing hub cap 19 provided with an oil plug 32. The cap is secured in place on the hub by means of cap screws 20 so as to retain a supply of fluid lubricant, such as indicated at 21, within the hub structure.

In applying this invention to the conventional hub and spindle, an annular spacing ring 17, contoured on its inner diameter to fit to the bearing band 16, is fitted over the spindle and forced against the bearing band to properly space the inner bearing 12 from the band 16 when the retaining nut 14 is properly adjusted. The spacing ring is provided with a resilient O-ring 33 which seals it fluid-tight to the spindle and with an external retaining flange 18.

Figure 3:
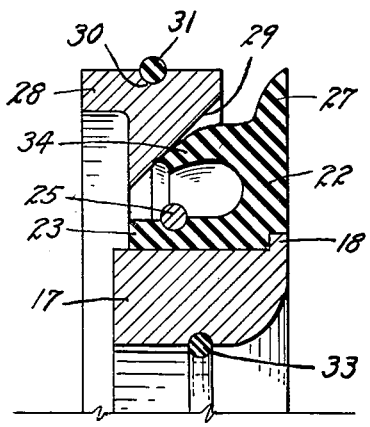
FIG. 3 is an enlarged detail section, taken on the line 3—3, FIG. 2.
Figure 2:
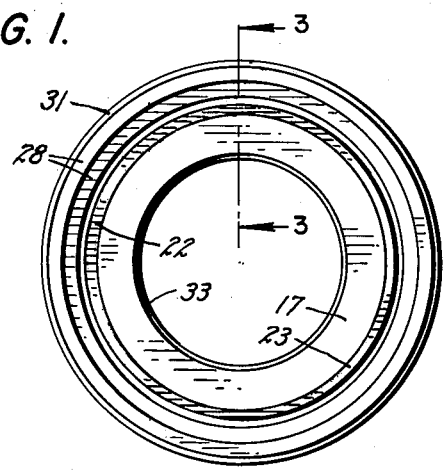
FIG. 2 is a face view of the improved wheel oil seal as it would appear when removed from the hub.
Figure 4:
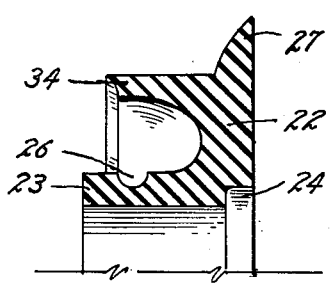
FIG. 4 is a similar section taken through a resilient sealing ring which is employed in the improved wheel oil seal, showing the ring as it would appear when disassembled from the wheel oil seal assembly.

The improved wheel oil seal employs a resilient, compressible sealing ring 22, formed from any suitable nonmetallic material, such as tread stock rubber, neoprene, or the like. The ring is formed with an initial cross-section, as shown, in the enlargement of FIG. 4. After installation, the ring assumes the cross-section of FIG. 3. The sealing ring is molded with a cylindrical sleeve portion 23 having an internal diameter to snugly and rigidly engage the outer surface of the spacing ring 17. The sleeve portion 23 is provided with an internal annular groove 24 to receive the retaining flange 18, and with a circumferential groove 26 adapted to receive a rigid wire retaining ring 25 which, when in place, securely compresses the sleeve portion 23 about the spacing ring 17 to securely lock and seal it thereon. The sealing ring 22 is also molded with a flexible skirt 34 positioned in concentrically spaced relation to the sleeve portion 23 and with an annular tapered resilient lip 27 which completely surrounds the entire sealing ring 22.

The sealing ring 22 is designed to contact an internal conical surface 29 upon a hub ring 28. The hub ring 28 has an external diameter to fit snugly within the wheel hub 11, and is provided with a circumferential ring groove 30 for receiving a resilient, elastic O-ring 31 which seals it fluid-tight to the interior surface of the hub 11 as shown in FIG. 1.

The improved wheel oil seal is installed by removing the wheel hub 11 and its bearings 12 and 13 from the axle spindle 10. The spacing ring 17, with the sealing ring 22 and the wire ring 25 thereon, is then slid into place over the spindle 10 and against the bearing band 16. The hub ring 28, with its O-ring 31, is now forced into the hub 11, against the outer race of the inner bearing 12 and the wheel hub 11 is replaced on the axle spindle 10. The retaining nut is replaced, and the hub cap 19 is secured in place by means of the cap screws 20. The hub is then partially filled with the fluid lubricant 21, the sealing plug 32 is replaced and the wheel is ready for use.

It will be noted that, as the wheel hub 11 is forced into place, the conical surface 29 on the hub ring 28 will contact the skirt 34 of the sealing ring 22, forcing the skirt radially inward throughout its entire periphery so as to place it under compression. The hub ring 28, of course, rotates with the wheel hub 11, and the stationary resilient skirt 34 maintains a light frictional contact with the conical surface of the rotating hub ring to prevent the escape of lubricant therebetween throughout the entire circumference. Lubricant cannot escape between the hub ring 28 and the hub 11 due to the sealing action of the O-ring 31. Lubricant cannot escape between the spacing ring 17 and the sealing ring 22 due to the tight resilient contact between the two insured by the compression imparted by the wire ring 25. Lubricant cannot escape between the axle spindle 10 and the spacing ring 17 due to the sealing action of the O-ring 33.

The outer diameter of the lip 27 is normally greater than the inner diameter of the hub 11 so that as the hub 11 is forced to its operating position, it will slightly flex the lip 27 outwardly to provide a dust seal between the sealing ring 22 and the hub 11 to prevent the entry of foreign materials to the frictional surface of the skirt 34 and the conical surface 29. Thus, wear is reduced to a minimum, however, should any wear occur, between the surfaces which are in frictional engagement, it will be automatically taken up by the tendency of the skirt 34 to expand and resume the normal position of FIG. 4.

While a specific form of the improvement has been described and illustrated herein, it is to be understood that the same may be varied within the scope of the appended claims, without departing from the spirit of the invention.

Having thus described the invention, what is claimed and desired secured by Letters Patent is:

1. A sealing device for sealing a wheel hub to an axle comprising: a hub; an annular spacing element affixed to said axle at the inner face of said hub; an annular hub ring fitted within said hub at the inner face thereof; a conical inner surface on said hub ring directed toward said spacing element; an annular resilient sealing ring fixedly fitted about said spacing element and extending radially outward thereabout in axially spaced relation to and outwardly from said conical inner surface; a flexible cylindrical skirt concentrically formed on and projecting from said sealing ring toward said conical surface and into frictional contact with said conical surface at all times, whether said hub is rotating or at rest, said skirt being flexed in a radial direction toward its axis by its contact with said conical surface so as to place the material of said skirt under compression; and a wire retaining ring imbedded in said sealing ring and acting to compress the latter about said spacing element.

2. A sealing device for sealing the hub of a wheel to an axle comprising: an annular spacing ring having an internal diameter to fit snugly over and about said axle so as to be maintained stationary by the latter, said spacing ring having a cylindrical external surface; an annular resilient sealing ring; an annular resilient sleeve formed on one face of said sealing ring and surrounding the external surface of said spacing ring in fixed engagement therewith so as to maintain said sealing ring in a plane at right angles to the axis of said axle; an annular flexible, normally cylindrical skirt of larger diameter than said sleeve projecting from the same face of said sealing ring as said skirt projects and positioned concentric with and radially spaced from the latter; an annular hub ring having an external diameter to fit snugly and concentrically within said hub so as to rotate with the latter; and an internal conical surface formed in said hub ring, said surface lying against and in frictional engagement with said cylindrical skirt at all times, whether said hub is rotating or at rest so as to flex the latter radially inward throughout its entire periphery, said skirt being flexed in a radial direction toward its axis by its contact with said conical surface so as to place the material of said skirt under compression to thereby cause said skirt to maintain sealing engagement with said conical surface in consequence of the inherent resiliency of said skirt.

3. A sealing device as described in claim 2 having a tapered annular lip formed integrally with and surrounding the periphery of said resilient sealing ring, said lip having an outside diameter substantially equal to the outside diameter of said hub ring to provide a closure for said hub when said device is in position therein.

References Cited in the file of this patent

UNITED STATES PATENTS

| | | |
|---|---|---|
| 2,008,682 | Christenson | July 23, 1935 |
| 2,009,281 | Stein | July 23, 1935 |
| 2,162,104 | Mosher | June 13, 1939 |
| 2,587,405 | Stevens et al. | Feb. 26, 1952 |
| 2,592,645 | Kayser | Apr. 15, 1952 |
| 2,637,574 | Diehl | May 5, 1953 |
| 2,657,104 | Kayser | Oct. 27, 1953 |

FOREIGN PATENTS

| | | |
|---|---|---|
| 896,876 | Germany | Nov. 16, 1953 |